3,232,997
PROCESS FOR THE PRODUCTION OF ALCOHOLS BY CATALYTIC HYDRATION OF OLEFINS
Wilhelm Ester, Herne, Westphalia, Germany, assignor to Hibernia-Chemie Gesellschaft mit beschrankter Haftung, Gelsenkirchen-Buer, Germany, a corporation of Germany
Filed July 19, 1961, Ser. No. 125,260
Claims priority, application Germany, July 20, 1960, B 58,668
6 Claims. (Cl. 260—641)

The present invention relates to a process for producing alcohols by catalytic hydration of olefins, and more particularly to such a process wherein steam and olefin in gaseous phase are contacted with a phosphoric acid-containing catalyst in a reaction zone lined with porous carbon material.

The synthetic production of alcohols by conducting olefins together with steam over specific catalysts is conventional. Within the framework of modern industrial methods, phosphoric acid is primarily used as catalyst for such hydration procedures, and the catalyst is usually employed on a porous carrier material. In practice, the carrying out of the conventional synthesis of alcohols by hydration of olefins is beset with various difficulties, in particular the corrosion of the walls of the reaction chamber, and the subsequent regenerators, by the action of the strong acid catalyst. Consequently, frequently after only a comparatively short period of operation, the reaction chamber is rendered useless, necessitating its replacement.

On the other hand, attempts have been made to provide protective measures against corrosion of the reaction chamber. Significantly, copper metal is used to line the reaction chamber as well as the subsequent regenerator or regenerators connected therewith, since it is well recognized that copper is substantially less subject to corrosion than, for example, iron which because of its comparatively low cost is commonly employed. Nevertheless, even with the use of copper linings, for the reaction chamber, and the subsequent regenerator apparatus, a small portion of the reaction mixture may pass through the copper lining due to the occurrence of local corrosions which inevitably will occur. Upon interrupting the reaction in such event, the pressure prevailing in the reaction chamber will, in turn, be decreased, whereupon frequently undesirable bulgings in the copper lining will occur because of the changes in pressure.

For avoiding this tendency toward corrosion, the pH value of the crude alcohol formed in the synthesis may be adjusted by the addition of alkaline material. The vaporous reaction product upon condensation may then be maintained within a pH value of from 6 to 9. Subsequently, the condensed product is fractionally distilled, thereafter hydrogenated by passage over a nickel catalyst in order to remove disturbing impurities, and finally the product is once again fractionally distilled. Apart from the fact that this procedure is quite cumbersome, the same does not represent a useful solution for the effective prevention of corrosion within the reactor chamber since the alkali addition takes place at a point in the process after the synthesis has been completed.

According to another technique, the corrosion of the reaction chamber is sought to be prevented by periodically reversing the flow direction of the reactants over the catalyst within the reaction chamber. Such reversal may take place, for example, once every 10–12 days. However, a significant decrease in the corrosion of the reaction chamber cannot be attained in this manner, and consequently, this technique has not found wide application on a commercial scale.

With respect to the use of copper-lined reaction vessels, it is well known that where an olefin is reacted, such as ethylene, the same contains slight quantities of acetylene which causes the poisoning of the catalyst material. This is true since acetylene is converted under the reaction conditions, in the presence of copper, into cuprene. This solid polymerization product coats the catalyst and thereby destroys its activity. Accordingly, the catalyst must be replaced from time to time where copper is present in the reaction chamber. To avoid this disturbing side reaction, olefin gas completely free from acetylene would have to be used, and in practice such gas could hardly be produced economically. Therefore, materials have been used for the reaction chamber which contain less than 10% copper. Unfortunately, such materials are very expensive and the fabrication of the reaction chamber therewith is carried out only with great difficulty.

As a result of all of the difficulties encountered in producing alcohols by catalytic hydration of olefins, in practice corrosions have been reduced to a tolerable extent only by employing suitable metal linings. While in the usual instance copper linings are preferred, even copper is exposed to corrosion in high degree due to the comparatively severe reaction conditions involved. Thus, copper does not endure for unlimited periods of operations as will be appreciated from the fact that a reaction chamber provided with a three millimeter copper lining will exhibit sufficient corrosion after only 7 months of operation that a new lining must replace the old.

It is an object of the present invention to overcome the foregoing disadvantages and to provide a process for producing alcohols by catalytic hydration of olefins in gaseous phase without corrosion of the reaction chamber.

It is another object of the invention to produce such alcohols by passing steam and olefin in gaseous phase into contact with a phosphoric acid-containing catalyst in a reaction zone lined with porous carbon material.

Other and further objects of the invention will become apparent from a study of the within specification and accompanying example.

It has been found, in accordance with the present invention that a process for producing alcohols by catalytic hydration of olefins in gaseous phase may be effectively provided whereby the reaction chamber is not subjected to corrosion as was the case in conventional hydration operations, using a metal lined reactor composed of a metal normally subject to phosphoric acid corrosion. The process comprises passing steam and olefin in gaseous phase into contact with a phosphoric acid-containing catalyst in a reaction zone defined by a lining of porous carbon material, at elevated temperatures and pressures, and thereafter recovering the reaction products formed.

The carbon material conveniently has a pore volume between about 10–70% and is preferably used in the form of carbon bricks or shaped structures. The lining is quite effective where used in a layer between about 10 and 80 millimeters in thickness. Where the lining is in the form of individual carbon pieces, the same may be suitably cemented with a binder material, such as aqueous alkali silicate solution.

The catalyst is disposed on an inert granular carrier material, such as one having a grain size of at least 0.8 millimeter diameter. The catalyst may be prepared by impregnating the carrier with mineral acid, such as phosphoric acid or any other suitable acid, thereafter calcining the impregnated carrier at temperatures between about 150 and 400 degrees C. in the presence of steam, then washing the calcined carrier with water and subsequently impregnating the carrier with phosphoric acid in a further impregnation step.

Significantly, where the catalyst is disposed on a carrier of porous carbon material, the same may be prepared by impregnating the carrier with phosphoric acid, without the need for calcining. Such an impregnation can be carried out by immersing the porous carbons into phosphoric acid.

In accordance with particular embodiment of the present invention, the reaction is carried out at a temperature between about 240 and 320 degrees C., although temperatures above about 150 degrees C. may be employed generally. The reaction is suitably effected under positive pressure, such as a pressure between about 20 and 80 atmospheres. The molar ratio of steam used with respect to the olefin in gaseous phase is preferably between about 0.4 and 0.8 mol per mol of olefin. The olefin material is gaseous ethylene for the production of ethanol. Propylene also can be used as starting material for the production of isopropanol, the reaction conditions being the same.

Accordingly, the process of the invention permits the production of alcohols corresponding to the olefin charged to be produced without a corrosion of the interior lining of the parts of the apparatus exposed to the reactants under the severe reaction conditions. Specifically, the reaction chamber, as well as the regenerators positioned thereafter, may be lined with the porous carbon material which is non-metallic, and inert with respect to the catalysts used as well as the reactants. Cuprene formation is simultaneously prevented in accordance with the invention due to the fact that the olefin gas in unable to come into contact with any copper along the reaction path.

While a lining of bricks of porous carbon material is used in the portions of the apparatus normally exposed to corrosion under the reaction conditions, sufficient gas penetration through the reaction path is possible. This is true especially since the carbon bricks employed have a significant porosity. So it is prevented that in case of a quick drop of pressure damages of the carbon lining can take place. Carbon bricks are most effective in accordance with the invention which have a volume of pores of above about 10%, and preferably the pore volume should be at least about 20% for obtaining good results. However, carbon bricks having substantially higher pore volumes may be used, the upper limit standing approximately at 70% pore volume.

For maintaining the lining of carbon material in fixed relation within the apparatus, inorganic binding agents may be suitably employed. Specifically, aqueous alkali silicate solutions, such as potassium silicate, have been found to be most suitable. In this connection, a commercial preparation of binder cement for the porous carbon bricks with good results is sold under the name of "SWK.-Kitt" (product of Farbwerke Hoechst AG., Frankfurt am Main Hochst). Organic binding agents are only useable insofar as the same do not undergo any changes under the reaction conditions which might endanger the durability of the linings. While the inorganic binding agents indicated hereinabove are unstable against the action of water at the reaction temperatures used, for practical applications, this is without importance since under the reaction conditions only the alkali portion of the binder cement is dissolved out. Thus, for example, potassium may be dissolved by water from the potassium silicate binder cement whereby silicic acid silicifies to form silica which assures a sufficient firmness for the fixing and binding of the carbon bricks in place.

It will be appreciated that by reason of the pressure of the catalyst layer contained in the reaction chamber, a sufficient solidity of the porous carbon brick lining will be attained, such pressure opposing any forces which might tend to move the bricks of the lining out of their normal position. Insofar as the brick lining does not come into direct contact with the catalyst material, as for example is the case in the upper of the reaction chamber, the carbon bricks may be appropriately arranged in self-supporting relation. This may be achieved by providing the bricks with tongue and groove portions in the well-known manner. Most advantageously, the bricked lining is arranged such that two layers of carbon bricks are used in staggered layer relationship such that the seam between adjacent bricks in one layer will be placed in staggered relation with respect to the seam corresponding thereto in the next layer. In this manner, leakage through the bricks will be prevented.

The porous carbon lining, in accordance with the invention, possesses the particular advantage that it is completely inert with respect to the catalyst material and the reaction components under the reaction conditions. No significant abrasion of the carbon lining takes place during catalytic operations and due to the important provision for the porosity of the lining, especially where porous carbon bricks are employed, the occurrence of pressure differences no longer leads to damage of the inner wall of the apparatus.

Most advantageously, due to the porosity of the bricks, a certain quantity of phosphoric acid is absorbed thereby within the reaction chamber contributing a very desirable additional catalytic effect for the reaction.

By reason of the porous carbon lining of the invention, any penetration of phosphoric acid through the lining which reaches the metal inner wall of the reaction chamber will be harmless. This is true since under the reaction conditions, for example where an iron reaction chamber is employed, a phosphate layer will form thereon which actually itself represents an effective corrosion protection coating. Inasmuch as the phosphoric acid does not flow through the reaction chamber immediately along the metal inner wall, the phosphate layer once formed will not be removed. The corrosion protection provided in this manner will be very effective in practical operations.

The importance of the foregoing corrosion protection, in accordance with the invention, will be appreciated from the fact that it is not always possible, in practice, to avoid the presence of water in aqueous form within the reaction system, especially in case of interruption or irregularities, taking place sometimes in the process. The flooding of the reaction chamber with water indeed leads to the dissolving out of the phosphoric acid from the catalyst impregnated carrier mass such that the same passes into contact in large quantities with the inner walls of the reaction chamber as well as of the subsequent apparatus of the system. Naturally, of course the heretofore unavoidable corrosions of the reaction chamber and other apparatus are rendered impossible by the provision for a porous carbon lining in accordance with the invention.

Generally, the overall process of the invention is carried out under the usual conditions, i.e. at temperatures above 150 degrees, and more appropriately between about 240 and 320 degrees C. In the same way, pressures, between about 20 and 80 atmospheres may be applied. The steam is charged in an amount of from 0.4 to 0.8 mol of water per mol of olefin and the catalyst is a phosphoric acid-containing catalyst.

With respect to the carrier material which may be used for the phosphoric acid catalyst, inert carriers are contemplated, such as kieselguhr, silicic acid, diatomaceous earth, acid minerals, such as acid salts, etc. The carrier materials are effectively provided in granular form in order to obtain a favorable gas penetration and an effective area of active catalyst. Of course, mixtures of carriers of the foregoing type may be used, especially where large granules of the same are concerned. The minimum grain size, however, should not go below 0.8 millimeter in diameter.

In accordance with a particular embodiment of the invention, the catalysts are prepared by impregnating the diatomaceous-shale-containing carrier material with phosphoric acid, or perhaps with another mineral acid, such as hydrochloric acid or sulfuric acid, and subsequently calcining the impregnated carrier at temperatures between about 150 and 400 degrees C. in the presence of steam. The calcined carrier is then washed with water and once more impregnated with phosphoric acid. This procedure has the advantage that the metallic compounds contained in the carrier material, such as iron oxide and aluminum oxide, are dissolved out and cannot later in the synthesis lead to clogging disturbances within the apparatus.

The preferred form of catalyst, however, is by means of a carrier material made of porous carbon similar to that used in forming the lining of the apparatus in accordance with the invention. The porous carbon material may be charged in suitable form, such as in the form of granules, cylindrical tablets, plates, or the like. Advantageously, where porous carbon is employed as carrier an additional calcination of the carrier substance need not be carried out. Due to the large volume of pores, the carbon carrier produced which is impregnated with phosphoric acid exhibits a high degree of catalytic activity.

In this connection, it will be appreciated that it is likewise possible to employ as carrier material coke in lump form. The preparation of the catalyst proceeds in the same way by impregnation with phosphoric acid in the foregoing manner.

While the particular thickness of the porous carbon lining of the reaction chamber and subsequent apparatus such as the regenerators will be developed in accordance with the result desired, i.e. avoidance of penetration therethrough and corrosion of the metal apparatus, a layer thickness of about 20 millimeters has proved to be optimum. Layer thickness for the lining, nevertheless, may generally range between 10 and 40 millimeters, especially where the carbon lining is in the form of porous carbon bricks.

In order to more clearly illustrate the present invention, the following example is set forth, and it will be understood that the invention is not to be limited thereby.

The annexed drawing shows a reactor, which can be used in accordance with the invention. The inner wall 2 of this reactor is lined with a porous carbon lining 1, this lining being so arranged that two layers of carbon bricks are used in a staggered layer relationship such that the seam between adjacent bricks in one layer will be placed in staggered relation with respect to the seam corresponding thereto in the next layer. The reactor is filled with the catalyst carriers 3. At 4 the gas, consisting of ethylene, steam and minor amounts of phosphoric acid, is introduced, thereafter streaming through the catalyst filling to the gas exit at the bottom of the reactor.

*Example*

A reaction chamber as shown in the drawing, having a volume of about 7 cubic meters, is lined with carbon bricks having a pore volume of 20% in two layers of 20 millimeters each, such that a lining of bricks, two layers thick, is provided. The single carbon bricks of the lining were of rectangular shape (240 x 120 x 10 mm.). As binding agent "SWK-Kitt" was used. A catalyst impregnated carrier material is placed into the reaction chamber and 14,500 normal cubic meters of an approximately 85% ethylene gas are passed therein per hour and agitated. The ethylene gas contained 13 to 15% ethane. 0.02% methane. The catalyst employed consists of 5 metric tons of cylindrically shaped diatomaceous earth carrier structures (8 x 3 mm.) which had been previously impregnated with phosphoric acid, thereafter calcined, washed, and then once more impregnated with phosphoric acid (according to German Patent 1,042,561). To the gas within the reaction chamber, 800 normal cubic meters of fresh, refined gas having a concentration of 97% $C_2H_4$, the rest being ethane and methane and an acetylene content of about 4,000 p.p.m. are added per hour. The temperature was 280° C., the pressure 70 atmospheres. About 195 cubic meters of 85% ethylene are released per hour and passed off as terminal gas (as compared with 210 cubic meters under the same reaction conditions but without using a carbon lining of the reactor walls; i.e. an almost 10% increase of the reaction rate). Simultaneously, with the passage of the gas into contact with the catalyst material, 6.1 cubic meters per hour of water in the form of steam are added. This takes place by admixing the steam with the circulating ethylene and injecting about 2.5 kg. per hour of phosphoric acid (calculated 100%) whereby the overall reaction will be effected. After connected regenerators are provided in the system behind the reaction chamber wherein about 8.5 cubic meters of a 13.5% ethyl alcohol reaction product are separated. After operating for several months in accordance with the foregoing, no corrosions could be ascertained on the metal parts of the reaction chamber and regenerators, all of which were lined with porous carbon bricks in the form of two layers, totaling 40 mm. in thickness. The catalyst material still retained its original quality and did not become caked. No cuprene formation could be detected and practically no abrasion of the porous carbon brickshad occurred.

Almost the same results are achieved if the process is carried out in the apparatus using smaller carbon bricks in the form of plates (20 x 10 x 5 mm.), having a pore volume of 25%. In this case about 205 cubic meters of 85% ethylene gas are released per hour and passed off as terminal gas.

What is claimed is:

1. In the process for producing alcohols by catalytic hydration of olefins in gaseous phase with steam in a metal lined reactor composed of a metal normally subject to phosphoric acid corrosion, the improvement which comprises carrying out the reaction in such reactor in a reaction zone defined by a lining of porous carbon material having a thickness between about 10 and 80 mm. and a pore volume of between about 10 and 70%, by passing steam and an aliphatic mono-olefin in gaseous phase in the molecular ratio of between about 0.4 and 0.8:1 into contact with a phosphoric acid catalyst at a temperature between about 150 and 320° C., and a pressure between about 20 and 80 atmospheres, and recovering the alcoholic reaction product thereby formed, said catalyst being disposed on an inert carrier material by impregnation thereon.

2. Improvement according to claim 1, wherein said lining is between about 10 and 40 mm. in thickness and said lining is in the form of individual carbon pieces cemented with aqueous alkali silicate solution as binder.

3. Improvement according to claim 1, wherein the carrier material is selected from the group consisting of kieselguhr, silicic acid, diatomaceous earth, acid minerals, and mixtures thereof, and the catalyst is prepared by impregnating the carrier material with a mineral acid selected from the group consisting of phosphoric, hydrochloric and sulfuric acids, then calcining the impregnated carrier material at temperatures between about 150–400° C. in the presence of steam, washing the calcined impregnated carrier material with water and impregnating the carrier material with phosphoric acid.

4. Improvement according to claim 3, wherein said carrier material is in the form of a granular carrier material having a grain size of at least 0.8 mm.

5. Improvement according to claim 1, wherein said carrier material is porous carbon material.

6. Improvement according to claim 1 wherein the olefin is selected from the group consisting of ethylene and propylene.

References Cited by the Examiner

UNITED STATES PATENTS

| | | | |
|---|---|---|---|
| Re. 20,739 | 5/1934 | Metzger | 260—641 |
| 2,075,212 | 3/1937 | Levermore et al. | 23—165 |
| 2,165,100 | 7/1939 | Hettrick | 23—165 |
| 2,232,610 | 2/1941 | Joshua et al. | 260—641 |
| 2,496,621 | 2/1950 | Deering | 260—641 |
| 2,569,092 | 9/1951 | Deering | 260—641 X |

OTHER REFERENCES

Ollinger: Chemical Industries, pages 683–88 (May 1944).

Oliver: Chemical Eng., pages 376–82 (Sept. 1952).

LEON ZITVER, *Primary Examiner.*